United States Patent
Jones (10) Patent No.: US 7,108,060 B2
(45) Date of Patent: *Sep. 19, 2006

(54) FRACTURING DIFFERENT LEVELS WITHIN A COMPLETION INTERVAL OF A WELL

(75) Inventor: Lloyd G. Jones, Granbury, TX (US)

(73) Assignee: ExxonMobil Oil Corporation, Irving, TX (US)

( * ) Notice: Subject to any disclaimer, the term of this patent is extended or adjusted under 35 U.S.C. 154(b) by 90 days.

This patent is subject to a terminal disclaimer.

(21) Appl. No.: 10/659,818

(22) Filed: Sep. 11, 2003

(65) Prior Publication Data

US 2004/0050551 A1 Mar. 18, 2004

Related U.S. Application Data

(63) Continuation of application No. 09/629,203, filed on Jul. 31, 2000, now Pat. No. 6,644,406.

(51) Int. Cl.
*E21B 43/267* (2006.01)
*E21B 43/26* (2006.01)

(52) U.S. Cl. ............... 166/177.5; 166/280.1; 166/235; 166/308.1

(58) Field of Classification Search ........... 166/268, 166/271, 278, 280, 284, 285, 306, 308.1, 166/192, 228, 235, 280.1, 177.5
See application file for complete search history.

(56) References Cited

U.S. PATENT DOCUMENTS

| 2,224,630 | A | 12/1940 | Dean et al. ............ 166/1 |
| 3,153,451 | A | 10/1964 | Chancellor et al. ........ 166/51 |
| 3,548,935 | A | 12/1970 | Harkins .............. 166/51 |
| 3,637,010 | A | 1/1972 | Maly et al. ............ 166/51 |
| 3,802,500 | A | 4/1974 | Schmidt ............. 166/51 |
| 3,830,294 | A | 8/1974 | Swanson, Jr. ........... 166/51 |
| 3,963,076 | A | 6/1976 | Winslow ............. 166/278 |
| 3,999,608 | A | 12/1976 | Smith ............... 166/278 |
| 4,018,282 | A | 4/1977 | Graham et al. ........ 166/278 |

(Continued)

FOREIGN PATENT DOCUMENTS

CA 2325761 11/2000

(Continued)

OTHER PUBLICATIONS

Attard, M., Mathes, R. A. and Mower, L. N. (1990) "*Gravel Packing in an Abnormally Pressured Chalk Reservoir: A Valhall Field Case Study*", SPE 18226, Feb. 1990, pp. 14-20 and 482-484.

(Continued)

*Primary Examiner*—Jennifer H. Gay
(74) *Attorney, Agent, or Firm*—ExxonMobil Oil Corporation Law Dept.

(57) ABSTRACT

Method and apparatus for fracturing different levels of a completion interval in a well. A workstring lowers a fracturing string which, in turn, is comprised of a base pipe which is blank except for perforated sections spaced along its length. Screen may be provided over said sections to block the flow of sand into the base pipe. An alternate flow path (e.g. shunt tubes) extends along the base pipe and has one or more outlets spaced along its length. A slurry is flowed into the annulus surrounding the fracturing string. As liquid is lost from the slurry, sand from the slurry will form bridges at said perforated sections thereby isolating portions of the annulus. Slurry then flows through the shunts tube(s) and out into the isolated portions to fracture the different levels in the completion interval.

12 Claims, 3 Drawing Sheets

U.S. PATENT DOCUMENTS

| | | | | |
|---|---|---|---|---|
| 4,018,283 A | 4/1977 | Watkins | | 166/278 |
| 4,044,832 A | 8/1977 | Richard et al. | | 166/278 |
| 4,046,198 A | 9/1977 | Gruesbeck et al. | | 166/278 |
| 4,127,173 A | 11/1978 | Watkins et al. | | 166/276 |
| 4,192,375 A | 3/1980 | Maly et al. | | 166/51 |
| 4,253,522 A | 3/1981 | Setterberg, Jr. | | 166/278 |
| 4,393,932 A | 7/1983 | Bodine | | 166/249 |
| 4,418,754 A | 12/1983 | Stepp | | 166/278 |
| 4,469,178 A | 9/1984 | Solum | | 166/278 |
| 4,522,264 A | 6/1985 | McNeer | | 166/278 |
| 4,553,595 A | 11/1985 | Huang et al. | | 166/278 |
| 4,558,742 A | 12/1985 | Huang et al. | | 166/278 |
| 4,570,714 A | 2/1986 | Turner et al. | | 166/278 |
| 4,657,079 A | 4/1987 | Nagaoka | | 166/231 |
| 4,681,163 A | 7/1987 | Guidry et al. | | 166/278 |
| 4,685,519 A | 8/1987 | Stowe et al. | | 166/278 |
| 4,700,777 A | 10/1987 | Luers | | 166/185 |
| 4,733,723 A | 3/1988 | Callegari, Sr. | | 166/51 |
| 4,754,807 A | 7/1988 | Lange | | 166/236 |
| 4,818,403 A | 4/1989 | Nagaoka | | 210/488 |
| 4,856,591 A | 8/1989 | Donovan et al. | | 166/278 |
| 4,858,691 A | 8/1989 | Ilfrey et al. | | 166/278 |
| 4,915,172 A | 4/1990 | Donovan et al. | | 166/278 |
| 4,915,173 A | 4/1990 | Davis | | 166/278 |
| 4,932,474 A | 6/1990 | Schroeder, Jr. et al. | | 166/278 |
| 4,945,991 A | 8/1990 | Jones | | 166/278 |
| 4,964,464 A | 10/1990 | Myers | | 166/278 |
| 4,969,522 A | 11/1990 | Whitehurst et al. | | 166/278 |
| 4,969,523 A | 11/1990 | Martin et al. | | 166/278 |
| 4,969,524 A | 11/1990 | Whiteley | | 166/278 |
| 5,069,279 A | 12/1991 | Nagaoka | | 166/234 |
| 5,082,052 A | 1/1992 | Jones et al. | | 166/51 |
| 5,113,935 A | 5/1992 | Jones et al. | | 166/51 |
| 5,161,613 A | 11/1992 | Jones | | 166/242 |
| 5,161,618 A * | 11/1992 | Jones et al. | | 166/308.1 |
| 5,246,158 A | 9/1993 | Nagaoka et al. | | 228/175 |
| 5,307,984 A | 5/1994 | Nagaoka et al. | | 228/189 |
| 5,311,942 A | 5/1994 | Nagaoka | | 166/232 |
| 5,333,688 A | 8/1994 | Jones et al. | | 166/278 |
| 5,333,689 A | 8/1994 | Jones et al. | | 166/278 |
| 5,390,966 A | 2/1995 | Cox et al. | | 284/137.1 |
| 5,417,284 A | 5/1995 | Jones | | 166/280 |
| 5,419,394 A | 5/1995 | Jones | | 166/51 |
| 5,435,391 A * | 7/1995 | Jones | | 166/308.1 |
| 5,476,143 A | 12/1995 | Sparlin et al. | | 166/233 |
| 5,515,915 A | 5/1996 | Jones et al. | | 166/51 |
| 5,560,427 A | 10/1996 | Jones | | 166/280 |
| 5,588,487 A | 12/1996 | Bryant | | 166/51 |
| 5,690,175 A | 11/1997 | Jones | | 166/278 |
| 5,787,980 A | 8/1998 | Sparlin et al. | | 166/231 |
| 5,842,516 A | 12/1998 | Jones | | 166/56 |
| 5,848,645 A | 12/1998 | Jones | | 166/280 |
| 5,868,200 A | 2/1999 | Bryant et al. | | 166/51 |
| 5,875,843 A | 3/1999 | Hill | | 166/250 |
| 5,890,533 A | 4/1999 | Jones | | 166/51 |
| 5,934,376 A | 8/1999 | Nguyen et al. | | 166/278 |
| 6,003,600 A | 12/1999 | Nguyen et al. | | 166/281 |
| 6,059,032 A | 5/2000 | Jones | | 166/278 |
| 6,220,345 B1 | 4/2001 | Jones et al. | | 166/51 |
| 6,227,303 B1 | 5/2001 | Jones | | 166/378 |
| 6,230,803 B1 | 5/2001 | Morton et al. | | 166/278 |
| 6,298,916 B1 | 10/2001 | Tibbles et al. | | 166/278 |
| 6,302,207 B1 | 10/2001 | Nguyen et al. | | 166/276 |
| 6,405,800 B1 | 6/2002 | Walker et al. | | 166/278 |
| 6,409,211 B1 | 6/2002 | Sheng et al. | | 280/730.2 |
| 6,409,219 B1 | 6/2002 | Broome et al. | | 285/3 |
| 6,427,775 B1 | 8/2002 | Dusterhoft et al. | | 166/278 |
| 6,446,722 B1 | 9/2002 | Nguyen et al. | | 166/278 |
| 6,481,494 B1 | 11/2002 | Dusterhoft et al. | | 166/51 |
| 6,497,284 B1 | 12/2002 | van Petegem et al. | | 166/297 |
| 6,516,881 B1 | 2/2003 | Hailey, Jr. | | 166/278 |
| 6,516,882 B1 | 2/2003 | McGregor et al. | | 166/278 |
| 6,644,406 B1 * | 11/2003 | Jones | | 166/308.1 |
| 2002/0066560 A1 | 6/2002 | Dusterhoft et al. | | 166/236 |
| 2002/0125007 A1 | 9/2002 | McGregor et al. | | 166/278 |
| 2002/0189809 A1 | 12/2002 | Nguyen et al. | | 166/278 |
| 2003/0000699 A1 | 1/2003 | Hailey, Jr. | | 166/278 |
| 2003/0000700 A1 | 1/2003 | Hailey, Jr. | | 166/278 |
| 2003/0000701 A1 | 1/2003 | Dusterhoft et al. | | 166/278 |
| 2003/0000702 A1 | 1/2003 | Streich et al. | | 166/278 |
| 2003/0010496 A1 | 1/2003 | McGregor et al. | | 166/278 |

FOREIGN PATENT DOCUMENTS

| | | |
|---|---|---|
| EP | 1087099 A1 | 3/2001 |
| EP | 1132571 A1 | 9/2001 |
| WO | WO 00/61913 | 10/2000 |
| WO | WO 01/14691 | 3/2001 |
| WO | 01/23045 | 11/2001 |

OTHER PUBLICATIONS

Bercegeay, E. P. and Richard, C. A. (1974) "*A One-Trip Gravel Packing System*", SPE 4771, Feb. 7-8, 1974, pp. 19-25 and Figs. 1-16.

Cox, Morris et al. (2002) "*Innovative Sand-Control Screen Assembly Enables Successful Multi-Lobe Frac Packs in Adverse Recompletion Conditions*", SPE 73723, Feb. 20-21, 2002, pp. 1-16.

Dickinson, W., Anderson, R. R., and Dykstra, H. (1987) "*Gravel Packing of Horizontal Wells*", SPE 16931, Sep. 27-30, 1987, pp. 519-528.

Duhon, P., Holley, A., Gardiner, N. and Grigsby, T. (1998) "*New Completion Techniques Applied to a Deepwater Gulf of Mexico TLP Completion Successfully Gravel Pack an Open-Hole Horizontal Interval of 2400 Feet*", SPE 50146, Oct. 12-14, 1998, pp. 477-487.

Durrett, J. L., Golbin, W. T., Murray, J. W. and Tighe, R. E. (1977) "*Seeking a Solution to Sand Control*", SPE 6210, Dec. 1977, pp. 1664-1672.

Elson, T. D., Darlington, R. H. and Mantooth, M. A. (1982) "*High-Angle Gravel Pack Completion Studies*", SPE 11012, Sep. 26-29, 1982, pp. 1-6, tables 1-3 and figs. 1-16.

Farley, Dave, (1986) "Gravel Pack Concept Solves Duning Problem," Petroleum Management, p. 44, 45 & 54, (Mar. 1986).

Forrest, J. K. (1990) "*Horizontal Gravel Packing Studies in a Full-Scale Model Wellbore*", SPE 20681, Sep. 23-26, 1990, pp. 647-655.

Foster, J., Gribsby, T. and LaFontaine, J. (1999) "*The Evolution of Horizontal Completion Techniques for the Gulf of Mexico. Where Have We Been and Where Are We Going*", SPE 53926, Apr. 21, 1999, pp. 1-15.

Grigsby, T. and Vitthal, S. (2002) "*Openhole Gravel Packing—An Evolving Mainstay Deepwater Completion Method*", SPE 77433, Sep. 2, 2002, pp. 1-16.

Gruesbeck, C., Salathiel, W. and Echols, E. (1979) "*Design of Gravel Packs in Deviated Wellbores*", SPE 6805, Jan. 1979, pp. 109-115.

Gruesbeck, C. and Collins, R. (1978) "*Particle Transport Through Perforations*", SPE 7006, Feb. 15-16, 1978, pp. 73-78, tables 1-4 and figs. 1-10.

Hudson, T. E. and Martin, J. W. (1988) "*Use of Low Density, Gravel-Pack Material Improves Placement Efficiency*", SPE 17169, Feb. 8-9, 1988, pp. 227-234.

Houchin, L. R., Dunlap, D. D. and Hutchinson, J. E. (1988) "*Formation Damage During Gravel-Pack Completions*", SPE 17166, Feb. 8-9, 1988, pp. 197-208.

Jones, L. G. et al. (1991) "*Alternate Path Gravel Packing*" SPE 22796, Oct. 6-9, 1991, pp. 391-398.

Jones, Lloyd G. (1999) "*Spectacular Wells Result From Alternate Path Technology*", Petroleum Engineer International, Hart Publications, US, vol. 72, No. 5, May 1999, pp. 31-33, 36-38.

LaFontaine, J. et al. (1999) "*New Concentric Annular Packing System Limits Bridging in Horizontal Gravel Packs*", SPE 56778, Oct. 3-6, 1999, pp. 1-11.

Ledlow, L. B., Sauer, C. W. and Till, M. V. (1985) "*Recent Design, Placement, and Evaluation Techniques Lead to Improved Gravel Pack Performance*", SPE 14162, Sep. 22, 1985, pp. 13, tables 1-3 and figs. 1-14.

Ledlow, Lewis (1985) "*A Quick Guide to Gravel Packing*", Oil Patch, vol. 10, No. 6, Aug. 1985, pp. 25-26.

Maly, G. P., Robinson, J. P. and Laurie, A. M. (1974) "*New Gravel Pack Tool for Improving Pack Placement*", SPE 4032, Journal of Petroleum Technology, Jan. 1974, pp. 19-24.

Nini, C. J. and Owen, G. W. (1983) "*Successful High-Angle Gravel Packing Techniques*", SPE 12105, Oct. 5-8, 1983, pp. 1-5, table 1 and figs. 1-6.

Parmigiano, J. M. (1976) "*Multizone Gravel-Pack Completion Method Works in High-Angle Holes*", Oil and Gas Journal, vol. 74, No. 2, Jan. 12, 1976, pp. 97-98.

Peden, J. M et al (1982) "*Laboratory Studies of the Effectiveness of Gravel Packing Perforations and Screen-Casing Annulus in Highly Deviated Wells*", EUR 311, European Petroleum Conference, London, England, Oct. 25-28, 1982, pp. 321-325, tables 1-3 and figs. 1-7.

Penberthy, W. L. and Cope, B. J. (1979) "*Design and Productivity of Gravel Packed Completions*", SPE 8428, 54th Ann. Fall Tech. Conf. Sep. 23-25, 1979, pp. 1-5, table 1 and figs. 1-19.

Penberthy, W. L. and Echols, E. E. (1991) "*Gravel Placement in Wells*", SPE 22793, Oct. 6-9, 1991, pp. 347-361.

Rensvold, R. F. and Decker, L. R. (1978) "*Full Scale Gravel Packing Model Studies*", EUR 39, European Petroleum Conference, London, England, Oct. 24-27, 1978, pp. 311-316 and figs 1-14.

Sanders, M. W. et al (2002) "*Gravel Pack Designs of Highly-Deviated Wells with an Alternative Flow-Path Concept*", SPE 73743, Feb. 20-21, 2002, pp. 1-16.

Saucier, R. J. (1974) "*Considerations in Gravel Pack Design*", Journal of Petroleum Technology, Feb. 1974, pp. 205-212.

Shryock, S. G. (1980) "*Gravel Packing Studies in a Full-Scale, Deviated Model Wellbore*", SPE 9421, Sep. 21-24, 1980, pp. 1-5, table 1 and figs. 1-13.

Solum, J. R. (1984) "*A New Technique in Sand Control Using Liner Vibration With Gravel Packing*", SPE 12479, Feb. 13-14, 1984, pp. 79-86, tables 1-4 and figs. 1-12.

Sparlin, D. D. (1987) "*Gravel Packing Innovations What's New?*" Drilling, Nov./Dec. 1987, pp. 17-20.

Sparlin, D. and Copeland, T. (1972) "*Pressure Packing With Concentrated Gravel Slurry*", SPE 4033, Oct. 8-11, 1972, pp. 1-7, table 1 and figs. 1-5.

Stiles, R. F., Colomb, G. T. and Farley, D. L. (1986) "*Development of a Gravity-Assisted Gravel Pack System*", SPE 15409, Oct. 5-8, 1986, pp. 1-9, table 1 and figs. 1-12.

Von Flatern, Rick (2002) "*Surving the Screen Test*", Offshore Engineer, Sep. 2002, pp. 29-32.

Wah, Kee Yong et al. (2002) "*New 7-in. Dual-Trip Multi-Zone Gravel Pack System Provide Cost Efficient Completions for Offshore China Development*" SPE 73728, Feb. 20-21, 2002, pp. 1-8.

Walvekar, S. and Ross, C. (2002) "*Production Enhancement Through Horizontal Gravel Pack*" SPE 73777, Feb. 20-21, 2002, pp. 1-10.

Welrich, J. B., Zaleski, T. E. and Tyler, S. L. (1990) "*One-Trip, Multizone Gravel-Packing Technique for Low-Pressure, Shallow Wells*" SPE Production Engineering, Nov. 1990, pp. 356-360.

Noor, M. Z. B. M et al. (2002) "*Enhanced Gravel-Pack Completions Revitalize a Mature Sand-Producing Field—A Case Study*" SPE 77919, Oct. 8-10, 2002, pp. 1-12.

Zaleski, Jr., T. E. (1989) "*Innovations in Completion Technology for Horizontal Wells*", Offshore, Feb. 1989, pp. 34-37.

Zaleski, Jr., T. E. and Spatz, E. (1988) "*Horizontal Completions Challenge for Industry*", Oil & Gas Journal, Offshore Report, May 2, 1988, pp. 58-70.

Baker Sand Control, "*Engineered Sand Control*", pp. 53-55; "Sand Control Technology", 1982-1983 Catalog.

Baker Sand Control, "*Gravel Pack Systems*", 1986-1987 Guide to Products and Services.

\* cited by examiner

FRACTURING DIFFERENT LEVELS WITHIN A COMPLETION INTERVAL OF A WELL

REFERENCE TO RELATED APPLICATIONS

This application is a continuation of application Ser. No. 09/629,203, filed on Jul. 31, 2000, which issued on Nov. 11, 2003 into U.S. Pat. No. 6,644,406.

DESCRIPTION

1. Technical Field

The present invention relates to completing a subterranean formation and in one of its aspects relates to a method and apparatus for fracturing different levels of a completion interval of a subterranean formation(s) in a single operation.

2. Background Art

In completing wells used in the production of hydrocarbons or the like, it is common to "hydraulically fracture" at least some interval of the production/injection formation(s) in order to improve flow of fluids into and/or out of the formation. As is well understood in the art, hydraulically fracturing is typically carried out by lowering a workstring into the well and isolating that portion of the wellbore which lies adjacent the interval to be fractured by setting packers or the like. Fracturing fluid or slurry (e.g. a heavy gel with or without props) is then pumped down the workstring and into the isolated interval at a pressure sufficient to separate or "fracture" the formation, thereby forming permeable channels within the formation.

In thin or relatively short intervals that are fairly homogeneous, standard fracturing techniques such as described above will normally produce a fracture or fractures throughout the length of the completion interval. However, these standard fracturing techniques experience problems when used in fracturing long or thick intervals or in intervals which are heterogeneous (i.e. made of several levels or zones which fracture under different pressures). For example, it is difficult, if possible at all, to fracture a second zone in such intervals once a first zone has started to fracture. The fracturing slurry will continue to flow into and enlarge the initial fracture as the pressure increases in the isolated portion of the wellbore rather than initiate additional fractures in the other zones or levels of the fracture interval.

Further, liquid from the fracturing slurry is typically "lost" into the formation through the initial fracture causing props, e.g. sand, to settle out of the slurry thereby forming a bridge or blockage within the wellbore adjacent the initial fracture. Such blockages prevent further flow of slurry to other zones in the fracture interval even if such zones had already experienced some initial breakdown, i.e. fracturing. This results in poor distribution of fractures throughout the fracture interval since often only the zone having the lowest breakdown pressure will be adequately fractured and propped.

Due to these problems, it is common to fracture a long and/or heterogeneous interval by carrying out a series of individual, conventional fracturing operations such as described above. That is, a first zone is fractured, then the workstring is repositioned in the wellbore and a second zone is fractured, and so on until the entire interval has been fractured. Of course, as will be recognized by those skilled in this art, this repetition is both expensive and time consuming and can significantly affect the overall economics of the well being completed.

To overcome the problems in fracturing long and/or heterogeneous intervals, several methods have been proposed wherein the fracturing of such intervals can be carried out with a single setting of a workstring wherein the fracturing slurry is delivered simultaneously to the different levels or zones within the interval through alternate flowpaths; for example, U.S. Pat. No. 5,161,618 to Jones et al. Another such method is disclosed in U.S. Pat. No. 5,435,391, issued Jul. 25, 1995, wherein alternating slugs of a gel and a proppant slurry are pumped down a single workstring and through alternate flowpaths to fracture and prop different levels within the fracture interval.

Still another such method is that disclosed in U.S. Pat. No. 5,417,284, issued May 23, 1995, wherein a fracturing gel is pumped down a workstring and into one end of the isolated wellbore while a proppant slurry is pumped at the same time through the well annulus and into the other end of the isolated annulus to carry out the fracturing of the different levels within the isolated interval. If a blockage occurs, the fracturing gel and/or slurry continues to be delivered throughout the fracture interval through alternate flowpaths to complete the fracturing of the interval.

A similar method is disclosed in U.S. Pat. No. 5,560,427 except a slurry splitter is positioned downhole in the workstring wherein a portion of the gel is separated from the fracturing slurry and is flowed into the bottom of the isolated interval to initiate fracturing within the interval. The remainder of the slurry is flowed into the upper end of the isolated interval to prop the fractures as they are being formed. Alternate flowpaths are provided to insure that the gel and/or slurry will be delivered to the different levels within the interval should a blockage occur in the well annulus before the fracturing operation is complete.

SUMMARY OF THE INVENTION

The present invention provides a method and apparatus for fracturing different levels of a completion interval of a subterranean formation which is traversed by a wellbore of a well. Basically, a workstring comprised of a tubing having a cross-over and a fracturing string is lowered into the wellbore until the fracturing string is positioned adjacent the completion interval to be fractured. The fracturing string is comprised of a base pipe which is essentially blank over most of its length (i.e. impermeable) except for a plurality of perforated sections which are spaced along its length. Each perforated section is formed by a plurality of openings (e.g. round holes, slots, etc.) through the wall of the base pipe which are spaced around and throughout the length of the perforated section. The lengths of the respective perforated sections may vary (e.g. from about 1 to about 300 feet) with the perforated sections being spaced from each other along the base pipe at varying distances (e.g. from about 10 to about 1000 feet).

In fracturing formations where little or no substantial particulate material, e.g. sand, will be produced with the formation fluids, the openings in the perforated sections may be merely un-screened openings through the base pipe, similar to the slots in a conventional "slotted liner". In formations where substantial sand will be produced, a screen means, e.g. wire wrap, is positioned over the openings at each perforated section to allow fluid to flow into the base pipe through the openings while preventing any substantial sand from flowing therethrough. At least one alternate flow path (e.g. shunt tubes) having an inlet and one or more spaced outlets, is provided on the fracturing string and extends longitudinally along the length of the base pipe. The wire wrap can be wrapped over the shunt tubes at each perforated section or the shunt tubes can be bent to pass over the wire wrap after the wire is in place on the base pipe. Where the shunt tubes are outside the wire wrap, a perforated sleeve or shroud can be positioned over the shunts at each perforated section to protect the shunts tubes during installation.

To carry out the fracturing method of the present invention, the workstring is positioned within the wellbore so that the fracturing string will extend substantially through said completion interval and will form a "completion interval annulus" with the wellbore which, in turn, is isolated from the well annulus above. A fracturing slurry, comprised of a fracturing liquid (e.g. high-viscosity gel) and proppants (e.g. sand), is flowed down the tubing string and out through the cross-over into the top of the completion interval annulus. As is common in routine fracture operations, a pad of fracturing fluid without proppant can be pumped into the completion interval annulus before the slurry to initiate the fracturing of the formation, if desired.

As will be understood in the art, when returns are taken through the well annulus, liquid from the fracturing slurry is lost both into the formation(s) within said completion interval and into said base pipe through the openings in the perforated sections along the base pipe. This causes the proppants (sand) from the slurry to "sand-out" within the completion interval annulus at the perforated sections to form sand bridges which, in turn, block further flow of slurry down through the completion interval annulus.

These sand bridges or blockages effectively act as packers which isolate portions of the completion annulus which lie between respective adjacent, perforated sections. The pumping of the slurry into the top of the completion interval annulus is continued but now it can only flow downward therein through the alternate flowpaths, i.e. shunts tubes. The slurry enters the tops of the tubes and flows downward to exit through the spaced outlets at different levels within the completion interval annulus; that is, the slurry exits into the isolated portions of the completion interval annulus. Continued pumping of the slurry will cause the pressure to build up within these isolated sections until the different levels within the completion interval are fractured and propped with the proppant. If any level of the completion interval is not to be fractured, no outlets are provided in the shunt tubes at this level; accordingly, no fracturing slurry can exit into the isolated portion of the completion interval annulus which lies adjacent the level which is not to be fractured.

Where returns are not to be taken through the well annulus, the flow of fluid into or through the base pipe is blocked since the base pipe and well annulus are filled with a non-compressible, completion fluid. Therefore, no substantial amount of liquid from the fracturing slurry will be initially lost through any of the perforated sections but will only be lost into the formation. Eventually, the formation will fracture at some level within the completion interval. Once this initial fracture is formed, liquid can now flow not only into the fracture but also into the base pipe through some of the perforated sections and back out into the completion interval annulus through the perforated section nearest the initial fracture.

This causes sand bridges to form at the perforated sections where liquid is being lost from the slurry. These sand bridges form "packers" which, in turn, isolate the portions of the completion interval annulus which lie therebetween. Slurry now can only flow through the alternate flow paths which deliver the slurry into the isolated portions of the completion interval annulus to finish the fracturing operation.

Once the completion interval has been fractured and propped, flow of slurry is ceased and the well is put on production. The fluids from the completion interval flow into the completion interval annulus and due to the difference in the viscosity of the slurry liquid (e.g. about 100 centipoises) and the produced fluids (e.g. about 1 centipoise), the produced fluids can readily flow through the sand bridges and into the base pipe through the openings in the perforated sections of the base pipe. Where a substantial amount of sand is produced with the formation fluids, the openings in the perforated section will be equipped with a screen means (e.g. wire wrap) which allows the produced fluids to pass therethrough while blocking any substantial flow of particulates.

BRIEF DESCRIPTION OF THE DRAWINGS

The actual construction, operation, and the apparent advantages of the present invention will be better understood by referring to the drawings, not necessarily to scale, in which like numerals identify like parts and in which.

While the invention will be described in connection with its preferred embodiments, it will be understood that this invention is not limited thereto. On the contrary, the invention is intended to cover all alternatives, modifications, and equivalents which may be included within the spirit and scope of the invention, as defined by the appended claims.

BEST KNOWN MODE FOR CARRYING OUT THE INVENTION

Figure 1:
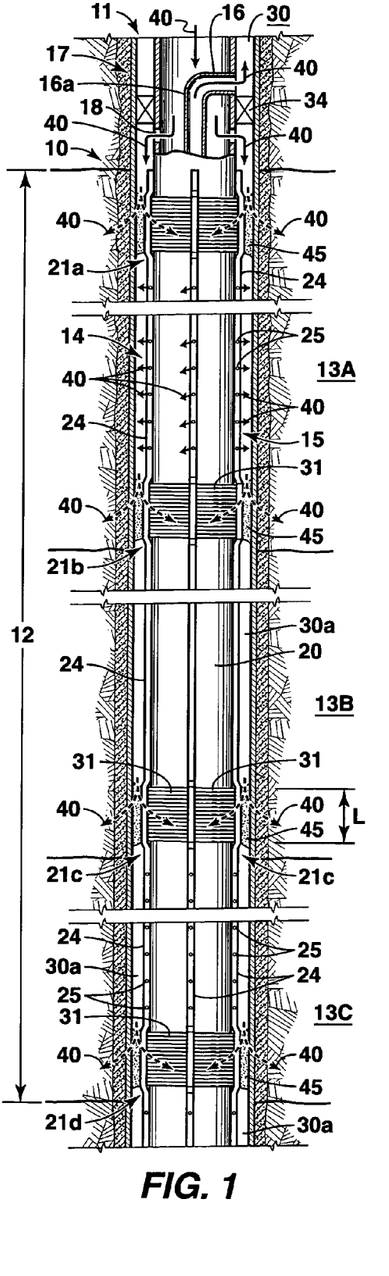
FIG. 1 is an elevational view, partly in section, of a portion of a wellbore having a fracturing string of the present invention in an operable position adjacent a completion interval to be fractured.

Referring more particularly to the drawings, FIG. 1 illustrates a portion of the wellbore 11 of a producing and/or injection well 10. Wellbore 11 extends from the surface (not shown) through a long completion interval 12 (i.e. production/injection interval). Well 10 is illustrated as having a vertical, "open hole" wellbore but it should be recognized by those skilled in the art that the present invention is equally applicable for use (a) in cased wells which are perforated adjacent the zones to be fractured as well as (b) in inclined and/or horizontal wellbores. Since the present invention is applicable for use in horizontal and inclined wellbores as well as vertical wellbores, the terms "upper and lower", "top and bottom", as used herein are relative terms and are intended to apply to the respective positions within a particular wellbore while the term "levels" or "zones" is meant to refer to respective positions lying along the wellbore between the terminals of the completion interval 12.

As illustrated, completion interval 12 is a formation(s) having a substantial length or thickness which extends along wellbore 11 and which is made up of a plurality (three shown) different levels or zones 13A, 13B, and 13C which, in turn, may be heterogeneous (i.e. each zone breaks down under a different fracturing pressures). A workstring 14 is positioned in wellbore 11 and extends from the surface (not shown) and substantially through completion interval 12. As illustrated, workstring 14 includes a fracturing string 15 which is connected through a conventional "crossover" 16 onto the lower end of tubing string 17 and which is positioned adjacent the completion interval 12 when in its operable position.

Figure 2:
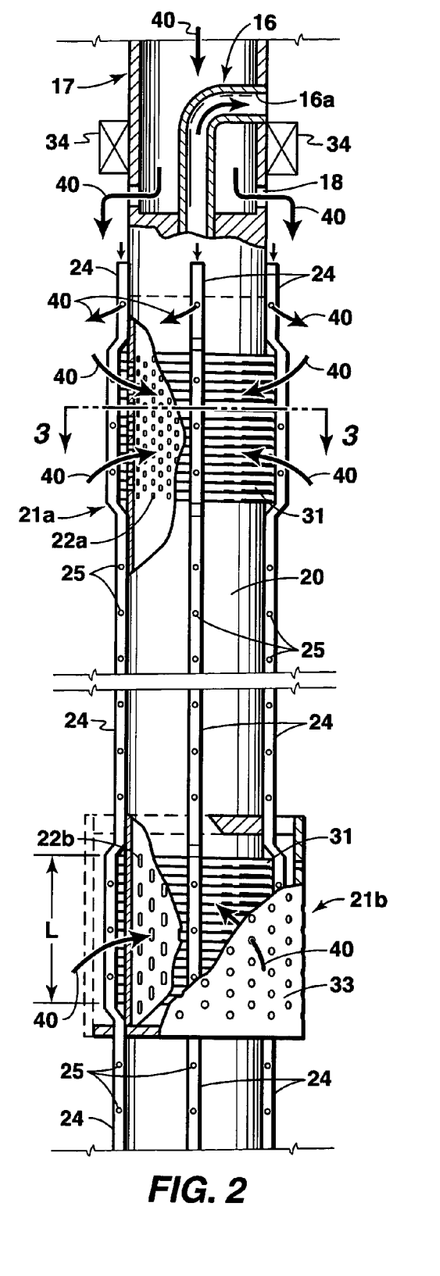
FIG. 2 is an enlarged, elevational view, partly in section, of a portion of the fracturing string of FIG. 1.

Fracturing string 15 is comprised of length of base pipe or conduit 20 which extends substantially throughout the completion interval 12 to be fractured. Base pipe 20 is blank (unperforated) throughout most of its length except for a plurality of spaced, perforated sections 21a, 21b, 21c, 21d which, in turn, are formed by a plurality of openings (e.g. holes 22a at 21a, slots 22b in 21b, FIG. 2) radially spaced around the base pipe and extending in rows throughout respective lengths "L" of base pipe 20. Openings 21 may be provided directly through base pipe 20 or each perforated section or may be formed in a separate coupling or length of pipe which is then joined into base pipe 20 at the appropriate spaced intervals. Openings 21 allow fluids to flow into base pipe 20 from the surrounding completion interval annulus 30a (FIG. 1), for a purpose described below. Both the length "L" of each perforated section 20a-d (e.g. between about 1 to about 300 feet) and the longitudinal spacing between perforated sections 21 (e.g. from about 10 to about 1000 feet, preferably about 10 feet apart) may vary within a single base pipe 20 depending on the characteristics of the particular interval 12 to be fractured.

Figure 3:
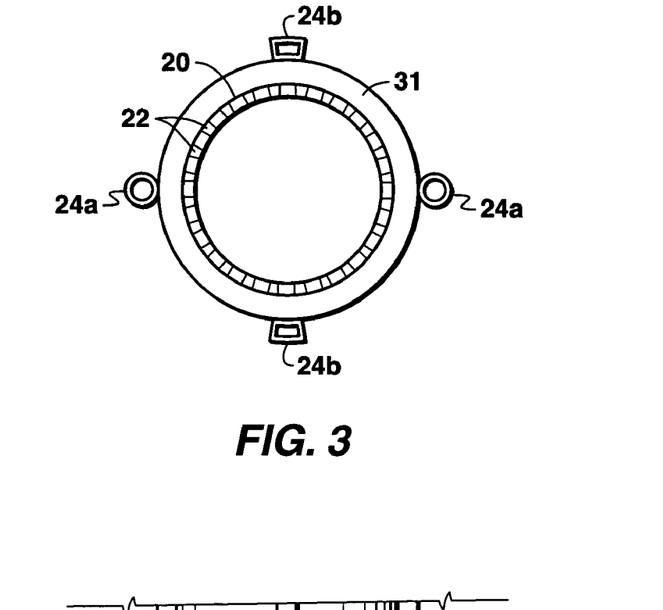
FIG. 3 is a sectional view taken through the line 3—3 of FIG. 2.
Figure 4:
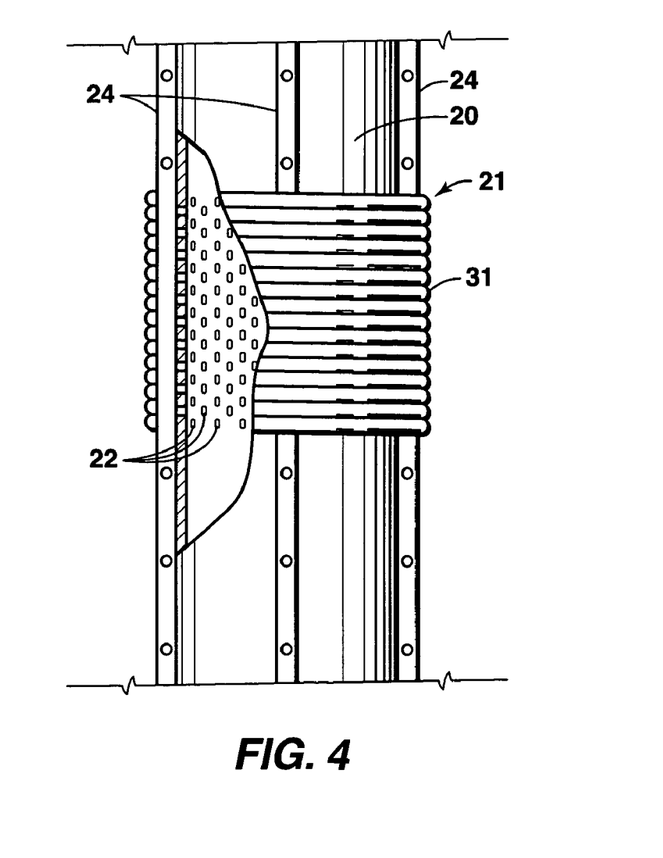
FIG. 4 is an elevational view, partly in section, of a further embodiment of the fracturing string of the present invention.

One or more (e.g., four shown in FIG. 3) relatively small shunt tubes 24 (i.e., 1 to 1½ inch diameter or smaller) are spaced radially around and extend longitudinally along the length of fracturing string 15. These shunt tubes may be round in cross-section (e.g. 24a, FIG. 3) or take other cross-sectional shapes (e.g. substantially rectangular, 24b, FIG. 3). Each of shunt tubes 24 has one or more outlets (e.g. spaced openings 25) along its respective length which provide "alternate flowpaths" for the delivery of fluids to different levels within the completion interval 12 as will be further discussed in detail below.

Each shunt tube may be open at least at its upper end to allow fluids to enter therein or where a plurality of outlets 25 are present, the entry of fluid may be provided through some of the openings 25, themselves (e.g., those near the top of each the tube). Further, while outlet openings 25 in each shunt tube 24 may open through the front of the tube, they may also exit through each side of shunt tube. Shunt tubes of this type have been used to provide alternate flowpaths for fluids in a variety of different well operations, see U.S. Pat. Nos. 4,945,991; 5,082,052; 5,113,935; 5,161,613; and 5,161,618.

Figure 5:
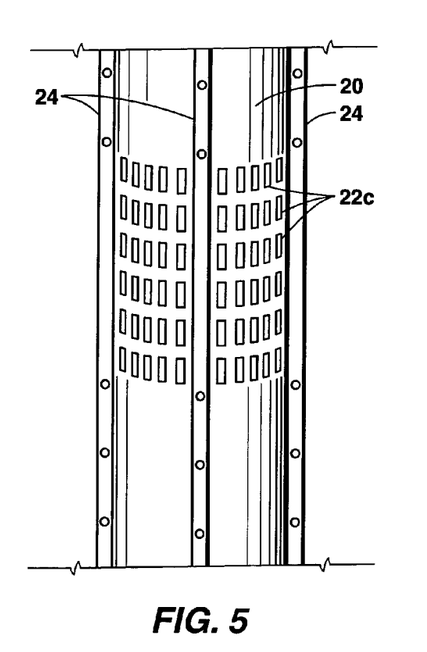
FIG. 5 is a partial elevational view of still another embodiment of the fracturing string of the present invention.

While the openings 22 in each perforated section 21 are designed to allow flow of fluid into base pipe 20, it is important that the flow of particulate material (e.g. proppants, produced sand, etc.) be blocked. This is not a problem when no substantial amount of particulate material will be produced along with the formation fluids from the fractured formation. Accordingly, unscreened openings (e.g. slots 22c, FIG. 5) may be provided in base pipe 20 in the same manner as the small slots are provided in well known, commercially-available "slotted liners". However, where substantial amounts of particulate material will be produced along with the formation fluids, a screening means is provided over the length "L" of each perforated section 21 and is sized to allow the flow of fluids therethrough while blocking any substantial flow of particulates, this being well understood in the well screen art.

The screening means may be comprised of any well known material which screens out the particulate material while allowing fluids to pass therethrough. For example, as illustrated in FIGS. 1–4, the screening means is comprised of a continuous length of a wrap wire 31 which, in turn, may be cut in a "keystone" cross-section (not shown). Wire 31 is wrapped around base pipe 20 to cover the openings 22 throughout a respective perforated section 21 and can be welded or otherwise secured thereto. Each coil of wire is slightly spaced from its adjacent coils to thereby form fluid passageways (not shown) between the respective coils. This is basically the same technique as is commonly used in the manufacture of many commercially-available, wire-wrap screens used in well completions. In one embodiment of the present invention (FIGS. 1–3), wire 31 is first wrapped around base pipe 20 at each perforated section 21 before shunt tubes are positioned and secured onto the base pipe. Each shunt tube is then slightly bent at each perforated section 21 to conform with the outer surface of the wire-wrap 31 as it transverses same.

Further, in this embodiment, a perforated sleeve or shroud 33 (only one shown at 21b in FIG. 2) may be placed over an entire perforated section 21 to protect shunt tube 24 during installation into wellbore 11 and to act as a centralizer for fracturing string 15, if needed. Shroud 33 can be made in two pieces and then welded or otherwise secured together after the pieces are fitted around section 21.

In another embodiment (FIG. 4), shunt tubes 24a are first positioned across perforated sections 21 and then wire 31 is wound over both base pipe 20 and shunts 24a. In this embodiment, the wire 31 protects the shunt tubes at each perforated section 21. It should be understood that the gap (i.e. well annulus 30, FIG. 1) between the wellbore 11 and the fracturing string 15, especially at the wire-wrapped, perforated sections 21, will be small (i.e. 1 to 1½ inches) in most well completions.

In operation, if wellbore 11 extends for a distance substantially below the bottom of completion interval 12, the wellbore is blocked-off adjacent the lower end of fracture interval 12 by a plug or packer (not shown), as will be understood in the art. Where fracture interval 12 will produce substantial amounts of particulate material along with the formation fluids when well 10 is put on production, the workstring 14 of FIG. 1, having cross-over 16 and fracturing string 15 at its lower end, is lowered into wellbore 11 thereby forming a well annulus 30 between the workstring 14 and the wellbore 11. Fracturing string 15 is positioned adjacent completion interval 12 and packer 34, which is carried on the workstring, is set to isolate the completion interval annulus 30a which lies adjacent completion interval 12 from the rest of the well annulus 30. As will be understood in the art, wellbore 11 and workstring 14 will be filled with the completion fluid that is usually present in wellbore 11 as workstring 14 is lowered therein.

With workstring 14 in place, a fracturing slurry (arrows 40, FIGS. 1 and 2) is pumped down workstring 14, i.e. down through tubing 17, out ports 18 of cross-over 16, and into the top of completion interval annulus 30a. The fracturing slurry may be made up of any well-known carrier fluids commonly used for fracturing formations (e.g., water, etc.) and proppants (e.g. sand) but preferably, the carrier fluid used in the fracturing slurry 40 of the present invention is a relatively, high-viscosity commercially-available "gel" (e.g. 100+centipoises) of the type routinely used in conventional fracturing operations (e.g., Versagel, product of Halliburton Company, Duncan, Okla. Of course, as is well known in the fracturing art, a pad of fracturing liquid (e.g. gel with no props) can be flowed into the wellbore before the slurry to initiate the fracture(s) if desired.

As the fracturing slurry 40 flows into the top of and down through completion interval annulus 30a, it begins to lose liquid into both the completion interval (e.g. zone 13A) and into base pipe 20 at the perforated sections 21. The liquid from the slurry will flow through the passageways formed between the coils of wire 31, through openings 22, into base pipe, through return pipe 16a in cross-over 16, and into well annulus 30 above packer 34. To insure rapid loss of fluid through each of the perforated sections 21, well annulus 30 above the cross-over 16 is opened at the surface to take returns from base pipe 20 through well annulus 30.

As liquid is lost from the slurry, "sand-outs", i.e. sand bridges or blockages 45, will form sequentially at each of the perforated sections. These blockages will form rapidly due to the leak-off of liquid from the slurry into both the zones of the completion interval and the base pipe 20. These bridges form effective barriers which prevent flow pass those points in the completion interval annulus 30a. That is, due to the high viscosity of the gel (e.g. 100+ centipoises), the liquid from the slurry can not readily flow through the sand bridges 45 once the bridges have formed. Only slight amounts of liquid from the slurry, if any, will pass through a respective sand bridge thereby slowly expanding the size of the sand bridge.

Since there are no openings in the blank, base pipe 20 except at perforated sections 21 and since the liquid from the slurry can no longer flow along annulus 30a once a sand bridge 45 is formed at a respective perforated section, slurry 40 now can only flow through the shunt tubes 24. The slurry enters the tops of tubes 24 and flows downward therein to exit into the different levels in completion interval annulus 30a. In the embodiment shown in FIGS. 1–4—4, the slurry exits through the plurality of vertically-spaced, outlet openings 25 in the shunt tubes 24 which lie between adjacent perforated sections 21. In the embodiment shown in FIG. 6, each shunt tube 24a is of a different length and has a single outlet at the bottom thereof through which the slurry exits at different levels within completion interval 12.

The sand bridges 45 effectively act as packers which, in turn, which isolate the respective portions of completion interval annulus 30a which lie therebetween. Continued pumping of slurry through the shunt tubes 24 and out into the respective levels of the completion interval annulus 30a will increase the pressure of the slurry within the respective isolated portions of the annulus 30a until a fracture is initiated in the respective completion zone(s). After the fracture in any specific isolated portion of annulus 30a "sands-off", and/or if the pressure in that isolated portion rises to the level of the pressure in the shunts, slurry is then diverted on downstream through the shunts and the process is repeated until the fracturing operation is completed. Accordingly, all of the desired completion zones can be fractured substantially throughout their respective lengths by merely pumping the fracturing slurry until all of the desired zones in the completion interval are fractured and propped.

In some well completions, it may be desirable to leave a particular zone(s) (e.g. zone 13B in FIG. 1) unfractured. In such completions, a portion of the length of each shunt tubes 24 is left blank or unperforated (i.e. have no openings 25 therein) wherein the blank portion of the shunts tubes will lie adjacent zone 13B when fracturing string 15 is in an operable position within the wellbore. Sand bridges 45 will still form at the perforated sections 21, as described above, but now the slurry 45 can only flow into the isolated portions of annulus 30a which lie adjacent zones 13A and 13C and not into zone 13b, thereby leaving zone 13B unfractured.

Figure 6:
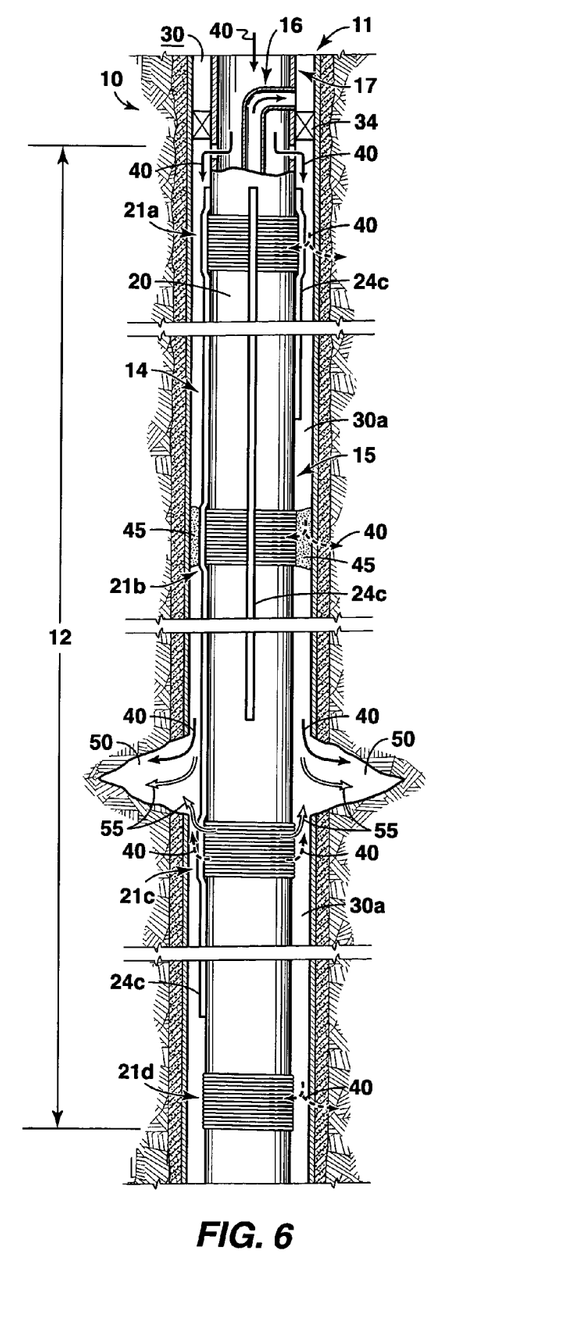
FIG. 6 is an elevational view, partly in section, of a portion of a wellbore having another embodiment of a fracturing string of the present invention in an operable position adjacent a completion interval to be fractured.

In many instances, it may be desirable not to take any returns through well annulus 30 during the fracturing operation. Referring now to FIG. 6, well annulus 30 is closed at the surface and wellbore 11 and workstring 14 is filled with a non-compressible, well completion fluid which is usually present after the drilling of wellbore 11 has been completed. Fracturing slurry 40 is flowed down tubing 17 and out through cross-over 16 into the top of completion interval annulus 30a. Since the flow of liquid from the slurry can not flow through perforated sections 21, it can only flow down the completion interval annulus 30a and into the formation at its "weakest" or most permeable level. As it flows into the formation, it forces at least some of the completion fluid in the annulus 30a ahead of it into the formation.

Once a fracture 50 (FIG. 6) is initiated in the formation (can be anywhere within completion interval 12), both liquid from slurry 40 and completion fluid (arrows 55 in FIG. 6) from within completion interval annulus 30a flow into the fracture due to the pressure of the fracturing slurry being pumped into annulus 30a. As completion fluid 55 is displaced from annulus 30a, liquid 40 from the slurry now begins to enter base pipe 20 through the perforated sections (e.g. 21a, 21b, and 21d) farthest from fracture 50. As liquid 40 enters base pipe 20, it forces completion fluid 55 out through perforated section (e.g. 21c) nearest fracture 50. Continued loss of liquid from slurry 40 through these perforated sections will now cause sand bridges to form at the respective perforated sections to isolate portions of annulus 30a, as described above. Once these sand bridges are formed, slurry 40 can now only flow through the shunt tubes 24c and is delivered to the isolated portions of annulus 30a through the respective shunt tubes to complete the fracturing of completion interval 12.

Once the desired zones have been fractured, the well can then be put on production. Tubing string 17 and cross-over 16 can be retrieved and replaced with a string of production tubing (not shown) which, in turn, can be "stabbed-in" or otherwise connected to fracturing string 15, the latter normally being left in place. Fluids will flow from the production zone(s) within the completion interval 12 and into completion interval annulus 30a. While the sand bridges 45 are substantially impermeable to the flow of high-viscosity liquids (e.g. fracturing gel having a viscosity of about 100+ centipoises), these bridges are readily permeable to the much-lower viscosity, produced fluids (e.g. oil and gas having viscosities of about ±1 centipoise). Accordingly, the production fluids can freely flow through the sand bridges 45 which now act as mini gravel-packs, the wire-wrapped screens 31 (if present), openings 22 in perforated sections 21, and into base pipe 20 for production to the surface.

What is claimed is:

1. An apparatus for fracturing different levels of a completion interval of a subterranean formation which is traversed by a wellbore, said apparatus comprising:
   a workstring comprising:
      a tubing string;
      a cross-over connected to the lower end of said tubing string; and
      a fracturing string connected to said cross-over and configured to form a completion interval annulus with said wellbore; said fracturing string comprising:

a length of blank, base pipe having a plurality of perforated sections spaced along its length, each of said perforated sections having a plurality of openings through said base pipe which extend along a portion of said length of said base pipe; wherein blockages are formed in said completion interval annulus adjacent to at least some of said perforated sections to isolate said levels of said completion interval annulus between said perforated sections; and at least one alternate flow path extending along said length of said base pipe; said at least one alternate flow path having an inlet and at least one outlet therein.

2. The apparatus of claim 1 including:

screen means positioned on said base pipe and over said plurality of openings in each of said perforated sections to allow flow of fluids into said base pipe through said perforated sections while preventing the flow of particulate material into said base pipe therethrough.

3. The apparatus of claim 2 wherein said screen means comprises:

wire wrapped around said base pipe and over said openings in said perforated sections, the coils of said wire having gaps therebetween to form passageways through which fluids can pass but which block the flow of particulates therethrough.

4. The apparatus of claim 3 wherein said wire is wrapped over said at least one shunt tube on at least one of said perforated sections.

5. The apparatus of claim 3 wherein said at least one shunt tube passes over said wire on at least one of said perforated sections.

6. The apparatus of claim 5 including:

a perforated sleeve positioned over said at least one shunt tube and said wire at least one of said perforated sections.

7. The apparatus of claim 2 wherein a portion of said length of said shunt tube is blank without any said outlet being positioned along said blank portion of said shunt tube whereby there is no flow from the shunt tube throughout said blank portion of said length of said shunt tube.

8. The apparatus of claim 1 wherein said alternate flow-path comprises:

a shunt tube extending longitudinally along said base pipe.

9. The apparatus of claim 1 wherein said alternate flow-path comprises:

a plurality of shunt tubes spaced radially around said fracturing string and extending longitudinally along said base pipe.

10. The apparatus of claim 1 wherein the length of each of said perforated sections along said base pipe is from about 1 to about 300 feet.

11. The apparatus of claim 1 wherein the length of each of said perforated sections along said base pipe is from about 5 to about 30 feet.

12. The apparatus of claim 1 wherein said perforated sections are spaced from each other along said blank base pipe at a distance of from about 10 feet to about 1000 feet.

* * * * *